(12) United States Patent
Zubieta Andueza et al.

(10) Patent No.: US 11,312,445 B2
(45) Date of Patent: Apr. 26, 2022

(54) COUPLED SUSPENSION SYSTEM FOR BICYCLES

(71) Applicant: ZUMA INNOVATION S.L., Galdakao (ES)

(72) Inventors: Mikel Zubieta Andueza, Galdakao (ES); Jon Madariaga Landajo, Galdakao (ES)

(73) Assignee: ZUMA INNOVATION S.L., Galdakao (ES)

( * ) Notice: Subject to any disclaimer, the term of this patent is extended or adjusted under 35 U.S.C. 154(b) by 0 days.

(21) Appl. No.: 15/734,494

(22) PCT Filed: May 22, 2019

(86) PCT No.: PCT/ES2019/070339
§ 371 (c)(1),
(2) Date: Dec. 2, 2020

(87) PCT Pub. No.: WO2019/234268
PCT Pub. Date: Dec. 12, 2019

(65) Prior Publication Data
US 2021/0229775 A1    Jul. 29, 2021

(30) Foreign Application Priority Data

Jun. 4, 2018    (ES) .............................. ES201830838U (51) Int. Cl.
*B62K 25/28*      (2006.01)
*B62K 21/20*      (2006.01)
(Continued)

(52) U.S. Cl.
CPC ............ *B62K 25/286* (2013.01); *B62K 21/20* (2013.01); *B62K 25/18* (2013.01); *B62K 25/28* (2013.01);
(Continued)

(58) Field of Classification Search
CPC ................................ B62K 21/08; B62K 21/20
(Continued)

(56) References Cited

U.S. PATENT DOCUMENTS 5,354,085 A * 10/1994 Gally ................... B62K 25/286
267/34
5,462,302 A    10/1995 Leitner
(Continued)

FOREIGN PATENT DOCUMENTS

CN    113212627 A  *  8/2021
DE    19745380 A1  *  4/1998  ........... B62K 25/286
(Continued)

OTHER PUBLICATIONS

Spanish Patent and Trademark Office, International Search Report and Written Opinion for international application No. PCT/ES2019/070339, dated Sep. 18, 2019, 18 pages (with English translation of International Search Report).

*Primary Examiner* — Kevin Hurley
*Assistant Examiner* — Hosam Shabara
(74) *Attorney, Agent, or Firm* — Seed IP Law Group LLP (57) ABSTRACT

A bicycle comprising a frame; a handlebar assembly attached to an upper steering tube of the frame in such a way that at least the relative rotation between the two with respect to an upper axis is allowed, but the relative displacements between both in the directions perpendicular to the upper axis are restricted; a fork attached to a lower steering tube of the frame so that it has the same degrees of freedom relative to the lower axis between the fork and the lower steering tube as the degrees of freedom relative to the upper axis between the handlebar assembly and the upper steering tube; and a means for rotation transmission for transmitting at least partially a rotation of the handlebar assembly with (Continued)

respect to the upper tube into a rotation of the fork with respect to the lower steering tube.

14 Claims, 5 Drawing Sheets

(51) Int. Cl.
    *B62K 21/08*     (2006.01)
    *B62K 25/18*     (2006.01)
    *B62K 25/04*     (2006.01)

(52) U.S. Cl.
    CPC ........ *B62K 21/08* (2013.01); *B62K 2025/047* (2013.01)

(58) Field of Classification Search
    USPC .......................................... 280/286
    See application file for complete search history.

(56) References Cited

U.S. PATENT DOCUMENTS

| | | | | |
|---|---|---|---|---|
| 6,164,424 | A * | 12/2000 | Girvin | B60G 17/01941 |
| | | | | 188/266.7 |
| 6,910,702 | B1 * | 6/2005 | Hals | B62K 21/20 |
| | | | | 280/283 |
| 10,351,206 | B2 * | 7/2019 | Voss | B62K 21/12 |
| 2004/0232650 | A1 | 11/2004 | Felsl et al. | |
| 2005/0236804 | A1 | 10/2005 | Alonzo | |
| 2006/0071444 | A1 | 4/2006 | Griffiths | |
| 2014/0035256 | A1 | 2/2014 | Zubieta Andueza | |

FOREIGN PATENT DOCUMENTS

| | | | | |
|---|---|---|---|---|
| EP | 1 241 087 | A1 | 9/2002 | |
| FR | 2832119 | A1 * | 5/2003 | ............... B62K 3/08 |
| WO | 01/81159 | A1 | 11/2001 | |
| WO | 2013/117777 | A1 | 8/2013 | |

\* cited by examiner

COUPLED SUSPENSION SYSTEM FOR BICYCLES

BACKGROUND

Technical Field

The present disclosure is part of the sector of suspension systems for bicycles.

Description of the Related Art

Most full suspension bikes on the market have two independent suspension systems—one on the front wheel and one on the rear wheel—just like motorcycles, as it has been proven to be the most effective way to absorb terrain irregularities. However, the suspensions in bicycles have to face a non-existent problem in motorcycles, which is the joint reciprocating movement in both suspensions caused by pedaling forces that makes the advance of the bicycle more ineffective.

To solve this problem, some inventions such as those described in US 2006/0071444 and US 2014-0035256 propose specific suspension systems for bicycles in which the displacement of both axles is coupled to each other to control the joint sway, and improve behavior during pedaling. However, these solutions are too complex and cumbersome, which is why they have not managed to gain a foothold in the market. The complexity comes mainly from overcoming the steering turn/rotation for being able to transmit the movement of the front wheel to the frame, and thus relate it to the movement of the rear wheel.

BRIEF SUMMARY

To overcome the drawbacks of the state of the art, an embodiment of the present invention proposes a bicycle comprising:
- at least one frame defined on a principal plane; which comprises an upper steering tube defined with respect to the upper axis that forms part of the main plane, and a lower steering tube defined with respect to the lower axis that forms part of the main plane and is significantly collinear with the upper axis;
- a handlebar assembly attached to the upper steering tube of the frame in such a way as to allow at least the relative rotation between the two with respect to the upper axis, but at least the relative displacements between the two in the directions perpendicular to the upper axis are limited;
- a fork attached to the lower steering tube of the frame so that it has the same relative degrees of freedom relative to the lower axis between the fork and the lower steering tube as the degrees of freedom between the handlebar assembly and the upper steering tube with respect to the upper axis; and
- a rotation transmission means or device for transmitting (at least partially) a rotation of the handlebar assembly relative to the upper steering tube into a rotation of the fork relative to the lower steering tube, wherein the vertical flexibility of the frame between the upper steering tube and the lower steering tube is greater than the sum of the vertical flexibility of the handlebar assembly between the point of attachment of the handlebar assembly to the upper steering tube and any other point of the handlebar assembly, and the vertical flexibility of the fork between the point of attachment of the fork to the lower steering tube and any other point of the fork.

Embodiments of the invention provide a simple, aesthetically nice solution by way of a split steering tube, in which the union of the handlebar assembly to the upper steering tube and that of the fork to the lower steering tube maintain the same aesthetics of a bicycle without front suspension, being the device or means of transmission of rotation the only thing that stands out with respect to the aesthetics of a conventional bicycle. An important part of the aesthetics of the set is some degree of symmetry between the upper and lower steering tube, restricting the same degrees of freedom in both cases.

In the US 2006/0071444 solution, as in the proposed solution, the displacement of the front axle occurs mainly between the upper part of the steering tube and the lower part of the steering tube, the latter being understood as the ball joint that connects the fork with the frame. However, the function of the lower part of the steering (regarding restriction of degrees of freedom) is completely different in this case from that of the upper part of the steering, and the resulting aesthetics of the solution are also more cumbersome.

In some embodiments, the attachment of the handlebar assembly to the upper steering tube of the frame limits all relative displacements and rotations except the turn with respect to the upper axis, defining a handlebar plane that comprises the upper axis and coincides with the main plane when the bicycle advances in a rectilinear direction; and in which the union of the fork to the lower steering tube of the frame limits all the relative displacements and rotations except the rotation with respect to the lower axis, defining a fork plane that includes the lower axis and coincides with the main plane when the bicycle advances in a rectilinear direction.

By limiting all the degrees of freedom except that of the rotation on the main axis, a more precise and rigid direction is achieved both in the handling of the handlebar assembly and in the action on the fork, with the sole function of transmitting the rotation to the device or means for rotation transmission.

In some embodiments, the device or means for rotation transmission is composed of a first link attached to the handlebar assembly in such a way that all relative displacement and turns are limited except for the rotation with respect to the handlebar axis perpendicular to the handlebar plane; and a second link attached to the fork in such a way that all relative displacement and rotations are limited except the rotation with respect to the fork axis perpendicular to the fork plane; the first connecting link and the second connecting link being connected by means of a connecting device or means that limits all displacements, but allows rotation in more than one direction.

A precise way to transmit the turn of the handlebar to the fork is by way of a set of links; the first one being articulated with respect to the plane of the handlebar and the second with respect to the plane of the fork. The two links are connected by a ball joint to compensate for misalignments due to the relative displacement of the two parts of the steering. These joints (and ball joint) can be mechanical elements or can be directly integrated in the device or means for rotation transmission as a flexible element.

A limitation of this configuration is that, in the displacement of the lower steering tube with respect to the upper one, the lower axis can be misaligned with respect to the upper one, so that the linkage system is not able to transmit to the fork the full rotation commanded by the handlebar assembly.

This problem becomes bigger as the displacement between the lower and upper steering tube is larger, so this solution is more appropriate for bicycles with short-travel suspensions, which are precisely those that obtain the most advantages from coupling the front suspension with the rear suspension by prioritizing pedaling efficiency over shock absorption.

In some embodiments, the rotation transmission means or device is a single controlled flexibility body firmly attached to the handlebar and fork assembly, defining a joint rotation axis according to the point of attachment of the handlebar assembly with the upper steering tube and the point of attachment of the fork with the lower steering tube, and that works preloaded in extension so that it fixes the handlebar assembly and the fork with respect to the frame in the direction of the joint axis of rotation, which together with a linear guide between the handlebar and fork assembly, restricts all movement and rotation except the relative movement of the handlebar with respect to the fork on the joint axis of rotation and the synchronized rotation of the handlebar and fork assembly with respect to the joint axis of rotation.

Rotation transmission imprecision can be avoided by creating a single pivot axis between the two steering parts that act as ball joints. The fixation of the offset with respect to the axle is done by preloading the device or means for rotation transmission, so that a certain load is maintained on the ball joints even when the front suspension is fully compressed. On the other hand, to fix the displacements perpendicular to the axis and other rotations, a guide is used in the device or means for rotation transmission, so that the flexible element of the device or means for rotation transmission only has to transmit the steering rotation.

In some embodiments, the device or means for rotation transmission is a single controlled flexibility body firmly attached to the handlebar and fork assembly, defining a joint rotation axis according to the point of attachment of the handlebar assembly with the upper steering tube and the point of attachment of the fork with the lower steering tube, and that works preloaded in extension so that it fixes the handlebar assembly and the fork with respect to the frame in the direction of the joint axis of rotation, restricting all movement and rotation except the relative movement of the handlebar assembly with respect to the fork on the joint axis of rotation and the synchronized rotation of the handlebar and fork assembly with respect to the joint axis of rotation.

By way of a more complex bending element, it is possible to provide flexibility along the steering axis while limiting the displacement in the directions perpendicular to it without the need for linear guidance, and therefore eliminating the friction associated with the guidance, and achieving a smoother ride.

The displacement obtainable from these flexing-based solutions is limited, so these solutions are only suitable for short-travel suspension bikes (road bikes, long-distance bikes, gravel bikes, etc.), which are also the ones that can benefit the most from the proposed suspension concept, achieving a pedaling behavior similar to shorter travel designs, but with greater shock absorption capacity.

In some embodiments, the device or means for rotation transmission is located within the projected inner volume of the upper and lower steering tubes of the frame.

By integrating the device or means for rotation transmission with the steering, less bulkiness and better aesthetics are achieved, more similar to current solutions that would facilitate market acceptance of the new product.

In some embodiments, the path of the virtual pivot of rotation that defines the relative displacement of the lower steering tube with respect to the upper steering tube is delimited in a space that confers anti-dive characteristics greater than 0%, and preferably between 50% and 100%.

The movement of the lower steering tube with respect to the upper one defines the displacement of the fork dropout that could be represented by a virtual pivot of rotation that moves along the travel that determines, among other things, the behavior of the front suspension when braking, defined by the anti-dive index. The anti-dive percentage indicates the extension of the front suspension caused by the kinematics of the suspension with respect to the compression derived from the increased load on the front wheel when braking, so that 100% anti-dive indicates that the front suspension will not move when braking. Commonly used telescopic suspensions have a negative anti-dive percentage that implies a high compression of the front suspension during braking that destabilizes the bicycle, therefore, bicycles that prioritize riding dynamics over absorption tend to have reduced suspension travels. With the aim of providing more absorption capacity while maintaining the riding dynamic qualities when pedaling but also when braking, it is proposed to use systems with positive anti-dive so that the compression when braking is less than in bicycles with shorter travel telescopic forks.

Another advantage of placing the virtual pivot in the positive anti-dive zone is that this means that the trajectory of the fork axis has a forward component that relaxes the steering angle and stabilizes the bicycle during compression. Due to the fact that on bicycles with telescopic forks the compression of the fork increases the steering angle and destabilizes the bicycle, the greater the travel of the bicycle, the smaller the steering angle of the bicycle to achieve stable downhill and impact behavior, however this leads to clumsier handling in uphills. With positive anti-dive suspension designs such as the one proposed, larger steering angles can be used for better handling in uphills while maintaining stability in downhills.

In some embodiments, the bicycle comprises a rear wheel attached to the rear dropouts of the frame, a saddle assembly attached to the frame's seat tube, and a set of pedals attached to the frame's bottom bracket, being the frame's vertical flexibility between the rear dropouts and the seat tube greater than the sum of the vertical flexibility of the rear wheel and the saddle assembly, and is at least an order of magnitude greater than the vertical flexibility of the frame between the bottom bracket and seat tube, and the vertical flexibility of the frame between the upper steering tube and the seat tube.

Beyond the anti-dive and steering stabilization advantages, the proposed front suspension configuration is most interesting when associated with a rear suspension. This rear suspension is composed of different mechanisms (articulations or guides) or flexible elements to achieve the displacement of the rear dropouts with respect to the rigid set of the frame defined by the upper steering tube, the seat tube and the bottom bracket that do not present significantly relevant relative vertical displacements. Within this definition are also most URT suspension designs in which the bottom bracket is located in the same piece as the rear axle, but due to the proximity of the pivot pin, its vertical displacement with respect to the saddle assembly is much lower than that of the rear dropouts.

In some embodiments, the trajectory of the virtual pivot of rotation that defines the relative displacement of the rear dropouts with respect to the seat tube and bottom bracket is delimited in a space that confers anti-squat and brake-squat characteristics close to 100%.

The brake-squat corresponds to the compression of the rear suspension in case of braking (negative acceleration) due to the kinematics of the suspension that counteracts the tendency to extend of the rear suspension. In order to have a riding dynamic behavior equivalent to bicycles with less suspension travel, it is important in this case that the brake-squat is high.

In the same way, a high anti-squat is also of interest to achieve the riding dynamic behavior equivalent to shorter-travel suspension bicycles. The anti-squat corresponds to the extension of the rear suspension due to the tension of the chain according to the kinematics of the suspension that counteracts the tendency to compress of the rear suspension during an acceleration.

In some embodiments, the bicycle comprises:
- a front absorber/damping means that controls the displacement of the lower steering tube with respect to the rigid assembly of the frame comprising the upper steering tube, the seat tube and the bottom bracket;
- a rear absorber/damping means that controls the movement of the rear dropouts with respect to the rigid frame assembly;
- a crossed absorption/damping means that controls the movement of the lower steering tube with respect to the rear dropouts.

The key contribution of the proposed solution is that in addition to the front and rear means of absorption/damping, there is a third crossed means of absorption/damping that adds additional opposition to the simultaneous compression of the front suspension and the rear suspension, reducing thus the sway when pedaling. These absorption/damping means can be air-oil, spring-oil dampers, elastomers, elastic elements without damping or even the bending of structural elements of the bicycle made of metal or carbon fiber.

In some embodiments, the bicycle comprises:
- a crossed absorption/damping means that controls the displacement of the lower steering tube with respect to the rear dropouts; and
- a front absorber/damping means that controls the displacement of the lower steering tube with respect to the rigid assembly of the frame comprising the upper steering tube, the seat tube and the bottom bracket; or
- a rear absorber/damping means that controls the movement of the rear dropouts with respect to the rigid frame assembly;

Of the three means of absorption/damping the most important is the crossed one. In fact, the one with the least rigidity of the other two could be eliminated by assigning all control of the displacement of that axle to the crossed means of absorption/damping, and limiting the remaining means of greater rigidity to the necessary front/rear stiffness differential.

In some embodiments the ratio between, the force ratio applied to the lower steering tube relative to the force applied on the crossed absorption/damping means, and the force ratio applied to the rear dropouts relative to the force applied to the crossed absorption/damping means, is of similar magnitude to the ratio of forces applied on the lower steering tube and on the rear dropouts when pedaling.

In order for the interaction between the front and rear suspensions by way of the crossed absorption/damping means to be optimal, the variant of the resultant force due to pedaling coming from the front axle that reaches the crossed means of absorption/damping must be the same to the one coming from the rear axle. In this condition and with a rigid crossed medium, the suspensions would not move under pedaling. However, when faced with obstacles on the ground, the force ratio between the front and rear axle is altered, causing the suspensions to swing, which leads to a certain absorption capacity of the obstacles. On the other hand, the absence of any crossed absorption/damping medium would lead to the maximum sway associated with independent suspension systems. In this way, by regulating the stiffness of the crossed absorption/damping means, it is possible to control the oscillation of the set of suspensions when pedaling.

BRIEF DESCRIPTION OF THE SEVERAL VIEWS OF THE DRAWINGS

To complement the description and in order to help a better understanding of the characteristics of embodiments of the invention, according to some examples of practical realization of the bicycle, a set of figures is attached as an integral part of the description in which, with illustrative and non-limiting character, the following has been represented.

DETAILED DESCRIPTION

Figure 1:
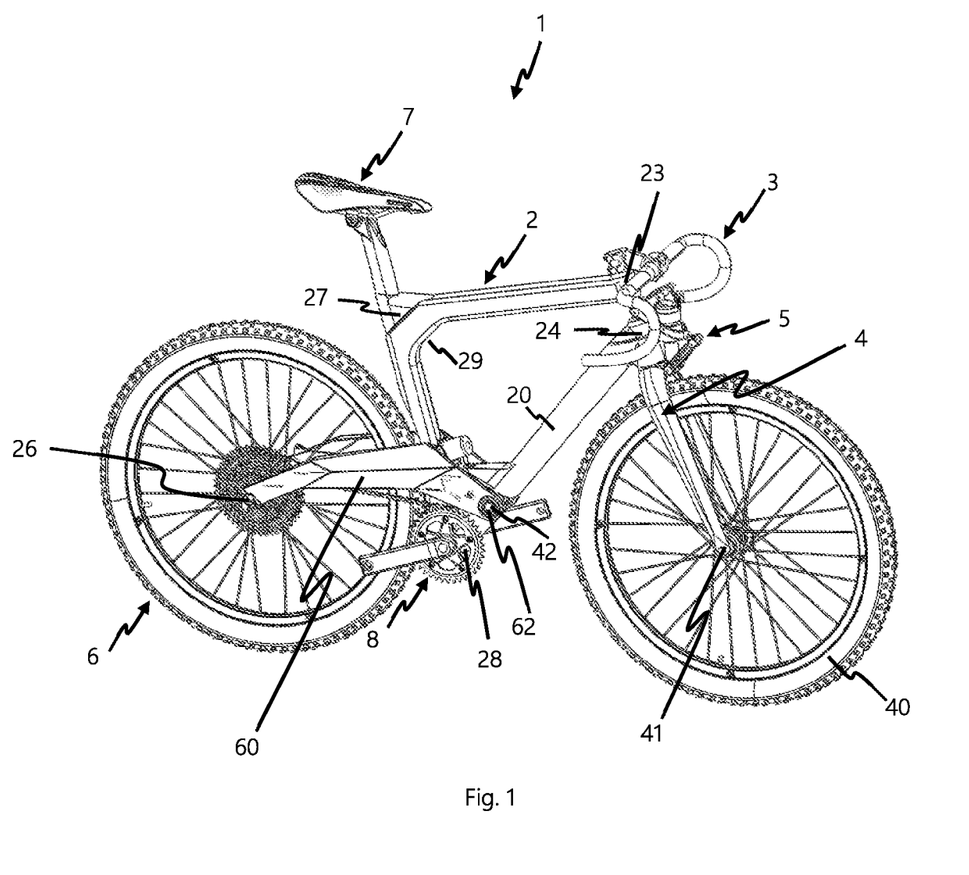
FIG. 1 shows a perspective representation of the first embodiment.
Figure 2:
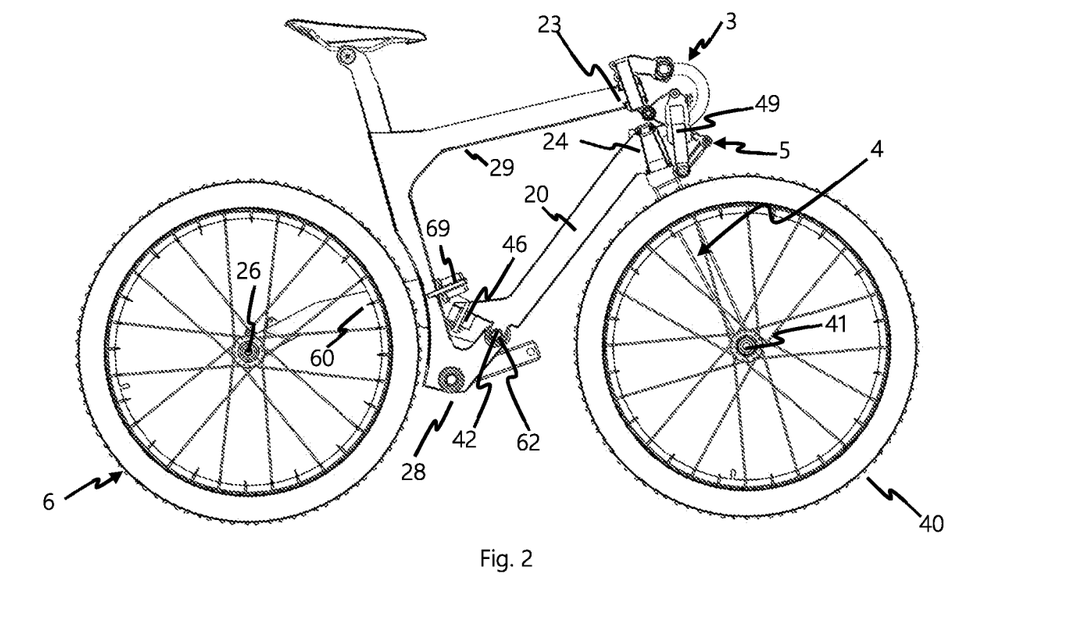
FIG. 2 shows a side sectional view of the first embodiment.
Figure 3:
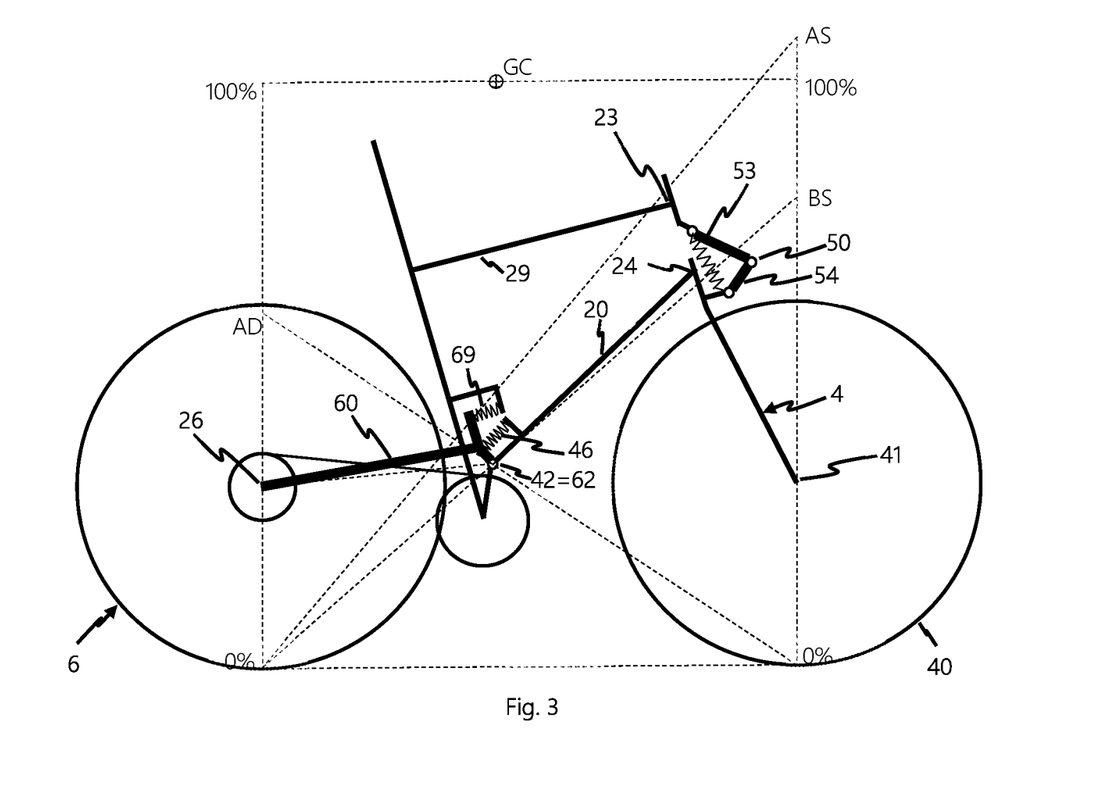
FIG. 3 is a schematic representation of the first embodiment.

FIG. 1 shows a first embodiment in which a bicycle 1 defined with respect to the rigid assembly 29 of frame 2 is observed, which presents the contact points of the cyclist with the bicycle; upper steering tube 23 attached to the handlebar assembly 3, seat tube 27 attached to the saddle assembly 7 and bottom bracket 28 attached to the pedal assembly 8. This rigid assembly 29 is optionally suspended from the rest of the frame 2 composed of chainstays 60, articulated with respect to the rigid assembly 29 according to the rear pivot 62, which has rear dropouts 26 on which the rear wheel 6 turns as it contacts the ground, and by the diagonal tube 20, articulated at the front pivot 42 which is concentric in this embodiment to the rear pivot 62, comprising a lower steering tube 24 to which the fork 4 is attached on whose front dropouts 41 the front wheel 40 that contacts the ground rotates (in other configurations there may be flexible elements instead of pivots and/or articulated tubes; likewise, instead of articulations, analogous movements of the suspension of the wheels can be obtained by means of other mechanisms that include several non-concentric points of articulation joints or other types of systems). As can be seen in FIGS. 2 and 3, the rear suspension, which is defined by the rotation of the chainstays 60 with respect to the rigid assembly 29, is optionally controlled by the rear absorption/damping means 69 which in this possible embodiment is an elastomer (in other configurations the absorption/damping is carried out by air-oil, spring-oil shock absorbers, other elastic elements or even the flexibility and damping of the structural elements of the frame), while the front suspension, which is defined by the rotation of the diagonal tube 20 with respect to the rigid assembly 29, it is optionally controlled by the front absorber/damping means 49 which in this case is an air-oil shock absorber with reduction due to the means for rotation transmission 5.

Optionally, bicycle 1 has a crossed absorption/damping means 46, which in this case is an elastomer, which controls the displacement of the rear suspension with respect to the front suspension, providing a differentiating behavior with respect to what is currently available in the market. The crossed absorption/damping medium 46 restricts the simultaneous compression of the front and rear suspension, the greater its stiffness the greater the restriction, thereby reducing the sway of the bicycle 1 when pedaling and increasing its riding efficiency. The crossed absorption/damping means 46 produces a coupling of the front and rear suspensions which also affects shock absorption. In the event of a force on the front wheel, part of that force will imply the compression of the front absorber/damping means 49 and therefore the compression of the front suspension, but another part of the force is transmitted to the crossed absorption/damping means 46 causing its compression at the same time that it transmits that force to the rear suspension, which is extended due to the extension force that generates in the rear absorption/damping medium 69. Considering that the sag (what the suspension is compressed from the total extension due to the weight of the rider) of both suspensions is less than 20%, the extension margin of the suspensions is much less than the compression, so for medium or large impacts on the front wheel the rear suspension will stop in extension and more compression (force) will be required in the crossed absorption/damping medium 46 for the compression of the front suspension, leading to a progressive front suspension with great sensitivity to small impacts but that does not stop at large impacts. The behavior of the rear suspension would be equivalent to the front. In short, with the inclusion of the crossed absorption/damping medium 46, the advantages of reducing the sway when pedaling are achieved, while at the same time adding progressiveness to the suspensions, with the disadvantage of a slight swinging (barely perceptible) in the absorption of small impacts.

It is clear that similar or equivalent embodiments can be obtained using other suspension configurations; multi-pivot systems, flexural-based systems, other types of absorption/damping means or directly integrated into the structure, etc.

The proposed solution is well suited to the needs of short-travel suspension bicycles (road, long-distance, gravel, etc.) so that it can provide greater absorption capacity without adversely affecting pedaling behavior. It is also of interest to control and limit the movement in the face of acceleration and deceleration, in order to obtain a behavior similar to bicycles with less suspension travel. This is achieved with anti-dive AD, brake-squat BS and anti-squat AS rates close to 100%. FIG. 3 shows the graphical calculation of these indexes.

Figure 4:
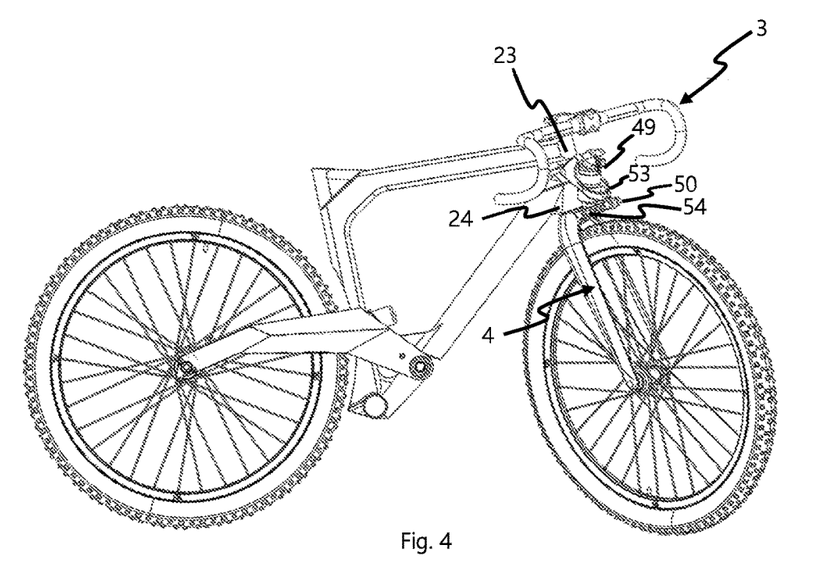
FIG. 4 shows in a side view the bicycle according to the first embodiment with the front suspension compressed to the maximum and with a certain turn of the handlebar.
Figure 5:
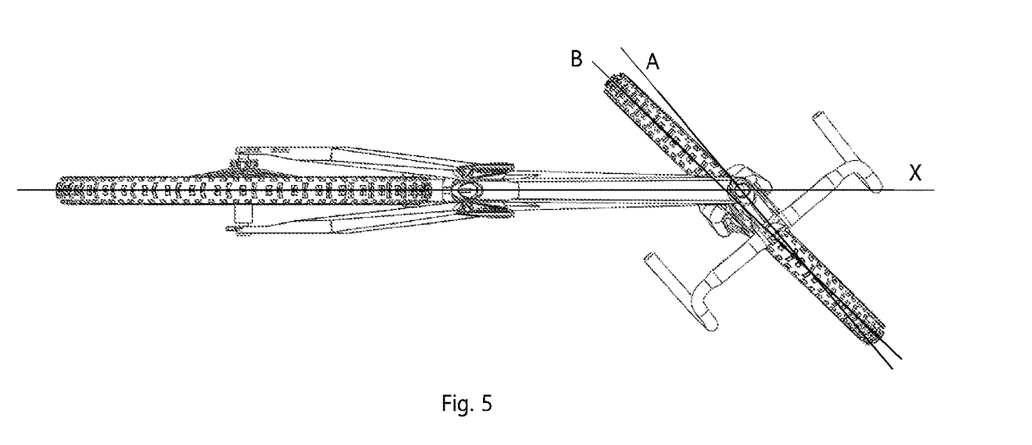
FIG. 5 shows in a top view the bicycle according to the first embodiment with the front suspension compressed to the maximum and with a certain turn of the handlebar.
Figure 6:
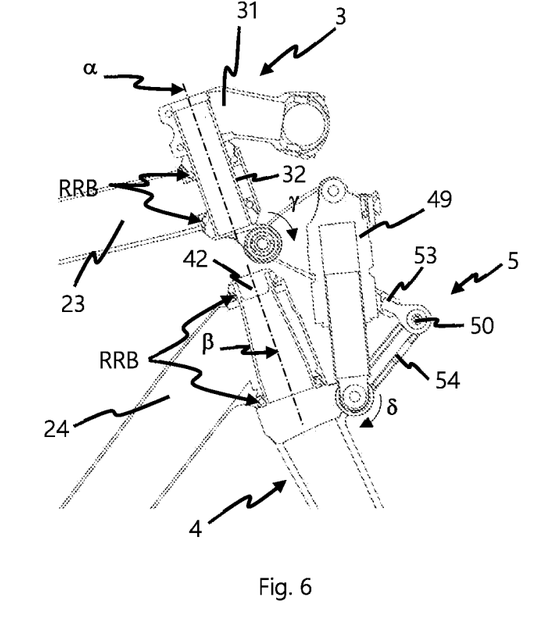
FIG. 6 shows a side sectional view of the steering area of the first embodiment.

The proposed solution of embodiments of the invention requires that frame 2 of bicycle 1 has a lower steering tube 24, relative to which fork 4 rotates, which moves relative to an upper steering tube 23, relative to which handlebar assembly 3 rotates, in the actuation of the front suspension, and a device or means for rotation transmission 5 to transmit the rotation from the handlebar assembly 3 to the fork 4. In FIG. 6 the steering mechanism of the first embodiment is observed in more detail. The fixing of both steering mechanisms is optionally carried out in an equivalent way to the fixing of the steerings commonly used on the market; the fork cap 42 exerts a preload against the fixed fork 4 deep groove ball bearings RRB against the bottom steering tube 24 allowing only the rotation about the axis $\beta$ between the fork 4 and the bottom steering tube 24; and the stem 31 of the handlebar assembly 3 exerts a preload against the auxiliary shaft 32 that fixes the deep groove ball bearings RRB against the upper steering tube 23 allowing only the rotation with respect to the axis $\alpha$ between the handlebar assembly 3 and the upper steering tube 23. The device or means for rotation transmission 5 is optionally composed of a first link 53 articulated with respect to the auxiliary axis 32 and a second link 54 articulated with respect to the fork 4, both connecting rods being joined by a ball joint 50. When the axes $\alpha$ and $\beta$ are aligned the rotation transmission of the handlebar assembly 3 to the fork 4 will be exact, which happens for the sag situation in the first embodiment. In this embodiment, the maximum misalignment of the axes $\alpha$ and $\beta$ occurs for the maximum compression of the front suspension as illustrated in FIGS. 4 and 5. In this condition it is observed that the fork plane B has rotated less with respect to the main plane X than the handlebar plane A illustrating the inaccuracy in the transmission of the rotation of the device or means for rotation transmission 5. In any case, this inaccuracy will only be appreciable for high compressions of the front suspension that should not coincide with high turns of the handlebar assembly 3.

Figure 7:
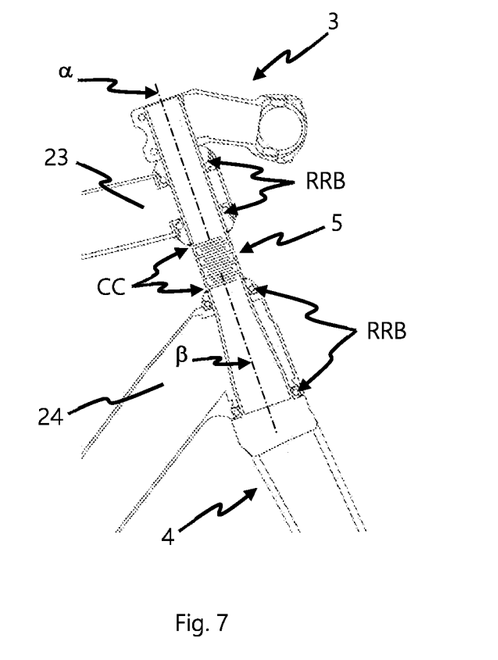
FIG. 7 shows a side sectional view of the steering zone in a first alternative configuration.

FIG. 7 shows an alternative steering mechanism in which the fork 4, the auxiliary shaft 32 and the means for rotation transmission 5 form a single piece, the deep groove ball bearings RRB being optionally preloaded with respect to the upper steering tube 23 and the lower steering tube 24 by means of circlips CC. The front suspension travel and the accuracy of the steering transmission that can be achieved depend on the elastic behavior of the means for rotation transmission 5 delimited between the upper 23 and lower 24 steering tubes, but in general these types of designs involve less travel and better steering accuracy than the configuration in FIG. 6.

Figure 8:
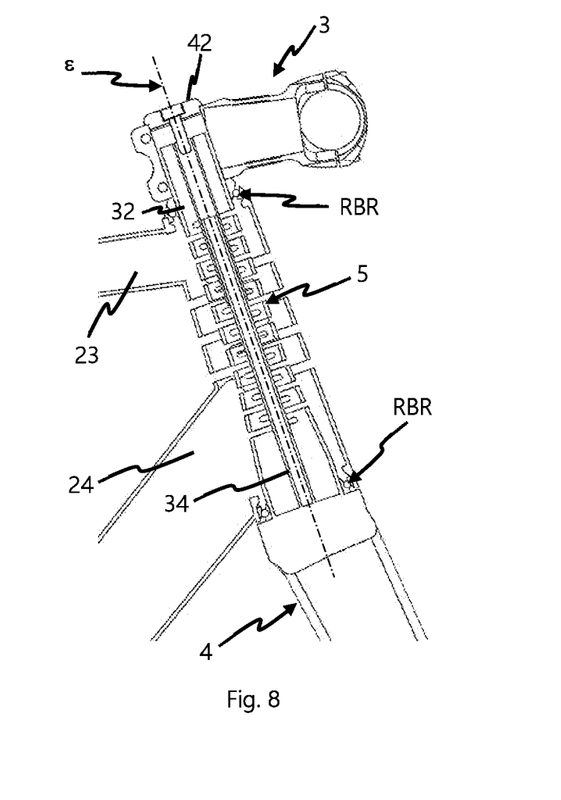
FIG. 8 shows a side sectional view of the steering area in a second alternative configuration, corresponding to the second embodiment.
Figure 9:
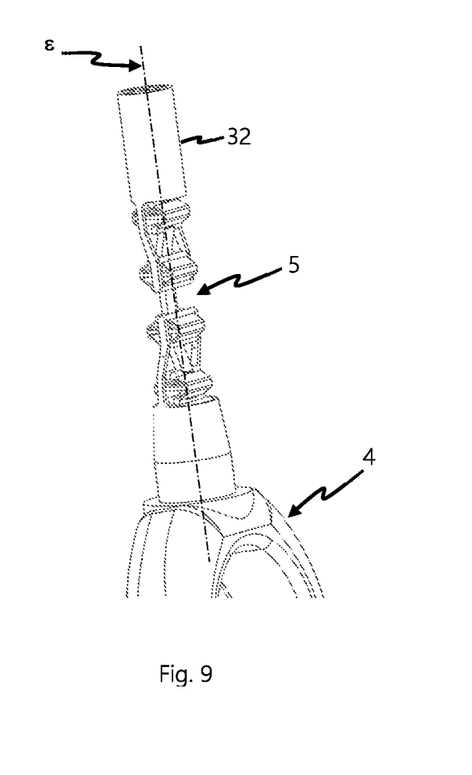
FIG. 9 shows a side sectional view of the steering area in a third alternative configuration.

However, to obtain an exact rotational transmission, one would have to go to alternatives with a single joint rotational axis c as in the case of the embodiments of FIGS. 8 and 9. In both embodiments, the auxiliary axis 32 and the device or means for rotation transmission 5 form a single piece together with fork 4 as in the embodiment of FIG. 7, but differ in fixing the steering mechanism. As seen in FIG. 8, the fork cap 42 optionally exerts a preload against the fork 4 that fixes the RBR self-aligning ball bearings against the upper steering tube 23 and lower steering tube 24 allowing only rotation with respect to the axis c of the handlebar assembly 3 and the fork 4 with respect to the fork 2. It should be noted that the orientation of the axis c varies according to the compression of the front suspension. During the compression of the front suspension, the extension preload at the junction of the fork cap 42 with the fork 4 is also altered, which will be minimum for the maximum compression situation of the front suspension. To guarantee sufficient preload in the maximum compression situation, the extension preload in the mounting situation (maximum extension of the front suspension) must be high, and therefore the compression preload between the upper steering tube 23 and the lower steering tube 24 also has to be raised. This high mounting preload on frame 2 will further increase with compression of the front suspension, with the flexibility of frame 2 between the steering tube 23 and steering tube 24 being the main component of the front absorber/damping means 49 in this setting. Optionally, the flexibility of the device or means for rotation transmission 5 will also contribute as front absorption/damping means 49, but its main mission will be to restrict all the movements and turns between the auxiliary axle 32 and the fork 4 except the displacement in the direction of the axle c. For this, FIG. 9 shows an embodiment optionally based on the Roberts mechanism that achieves a purely linear bending of the assembly. Another alternative is to use simpler bending mechanisms as in FIG. 8 and optionally complement it with a linear guide 34.

Figure 10:
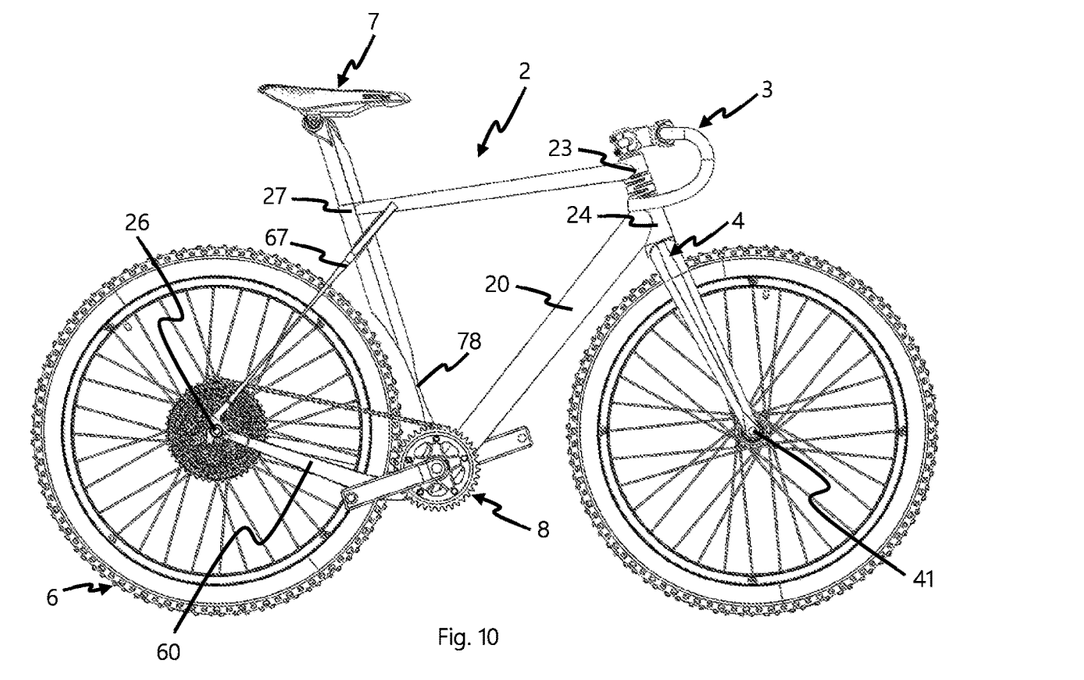
FIG. 10 shows a side view of the second embodiment.
Figure 11:
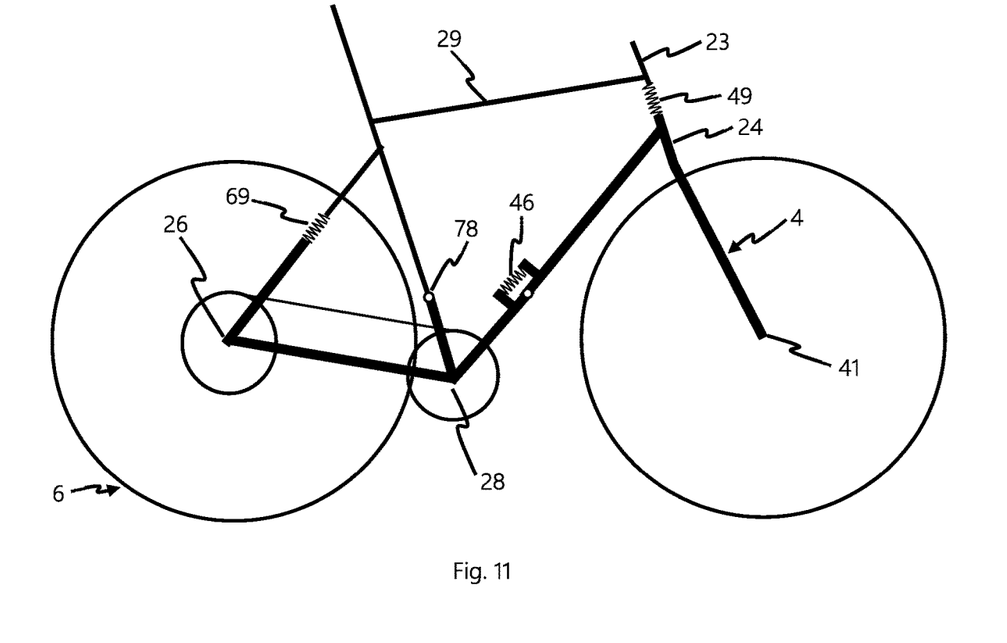
FIG. 11 is a schematic representation of the second embodiment.

FIG. 10 shows a second embodiment optionally based on a flex mechanism similar to that of FIG. 8, in which the rear suspension is also based on the flex of frame 2. Optionally, and unlike the first embodiment shown in FIG. 1, in this second embodiment the front and rear suspension are not the main degrees of freedom, in this case the main degree of freedom is that of the roll due to the flexion of the flexible pivot 78 of the frame 2. Optionally the bottom bracket 28 of the frame is physically located in the mobile part associated with the rear dropouts 26 and front dropouts 41 that move with respect to the rigid assembly 29 of frame 2, but its movement is minimal due to its location, with which the behavior is equivalent to being rigidly attached to the rigid assembly 29. In this configuration, optionally, the second degree of freedom would come from the bending in the diagonal tube 20 or the chainstays 60. FIG. 11 schematically illustrates the first case in which the flexing of the diagonal tube 20 is represented by a virtual pivot of rotation and a crossed absorption/damping means 46 that allows the differentiated movement of the front axle with respect to the rear, whereby the bending of the frame 2 between the upper steering tube 23 and the lower steering tube 24 together with the bending of the device or means for rotation transmission 5 form the front absorption/damping means 49 which mainly controls the movement of the front suspension, and the flexing of the seat-stays 67 which optionally form the rear absorber/damping means 69 which primarily controls the movement of the rear suspension.

Optionally, the downtube 20 and chainstays 60 will be considerably stiff so that the crossed absorption/damping means 46 is stiff, and minimizes sway when pedaling at the level of a stiff bicycle. The advantage of this embodiment would be that, even though it is very rigid when facing pedaling, it would have a remarkable capacity to absorb impacts when swinging due to the flexibility of the frame 2 (flexibility of the flexible pivot 78, tie rods 67, device or means for rotation transmission 5, chainstays 60, downtube 20, etc.).

It should be remembered that for the correct operation of the steering mechanism according to the mechanism of FIG. 8, the upper steering tube 23 should be preloaded in compression with respect to the lower steering tube 24, which requires that the entire frame 2 be in one preload situation at the time of assembly with both suspensions at their maximum extension. To limit stresses in frame 2 and accommodate bending capabilities of the same, the suspension travel and preloads used would be reduced in this second embodiment, so that the shock absorbing capabilities of bicycle 1 would be limited, but clearly superior to those of a rigid frame, while the behavior when pedaling is similar, this being a significant advantage of this second embodiment.

In this text, the word "comprise" and its variants (such as "comprising", etc.) should not be interpreted in an exclusive way, that is, they do not exclude the possibility that what is described includes other elements, steps, etc.

On the other hand, the invention is not limited to the specific embodiments that have been described but also encompasses, for example, the variants that can be carried out by the average person skilled in the art (for example, regarding the choice of materials, dimensions, components, configuration, etc.), within the meaning of the claims. Accordingly, in general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A bicycle, comprising:
   at least one frame defined in a principal plane; which comprises an upper steering tube defined with respect to an upper axis that is part of the main plane, and a lower steering tube defined with respect to a lower axis that forms part of the main plane and is significantly collinear with the upper axis;
   a handlebar assembly attached to the upper steering tube of the frame in such a way that at least a relative rotation between the handlebar assembly and the upper steering tube is allowed with respect to the upper axis, but relative displacements between the handlebar assembly and the upper steering tube are limited at least in directions perpendicular to the upper axis;
   a fork attached to the lower steering tube of the frame so that the fork has the same degrees of freedom relative to the lower axis between the fork and the lower steering tube as the degrees of freedom between the handlebar assembly and the upper steering tube with respect to the upper axis; and
   a means for rotation transmission for transmitting at least partially a rotation of the handlebar assembly with respect to the upper tube in a rotation of the fork with respect to the lower tube,
   wherein a vertical flexibility of the frame between the upper steering tube and the lower steering tube is greater than a sum of a vertical flexibility of the handlebar assembly between a point of attachment of the handlebar assembly to the upper steering tube and any other point of the handlebar assembly, and a vertical flexibility of the fork between a point of attachment of the fork to the lower steering tube and any other point of the fork.

2. The bicycle according to claim 1, in which the attachment of the handlebar assembly to the upper steering tube of the frame limits all relative movements and rotations except the rotation with respect to the upper axis, defining a handlebar plane that comprises the upper axis and coincides with the main plane when the bicycle advances in a rectilinear direction; and
   in which the attachment of the fork to the lower steering tube of the frame limits all the relative movements and rotations except the rotation with respect to the lower axis, defining a fork plane which comprises the lower axis and coincides with the main plane when the bicycle advances in a rectilinear direction.

3. The bicycle according to claim 2, in which the means for rotation transmission is composed of a first link joined to the handlebar assembly so that all relative movements and rotations are limited except the rotation with respect to the handlebar axis perpendicular to the handlebar plane; and a second link joined to the fork so that all relative displacement and rotations are limited except the rotation with respect to the fork axis perpendicular to the fork plane, the first link and the second link being joined by joining means that limits all displacements, but allows rotation in more than one direction.

4. The bicycle according to claim 1, in which the means for rotation transmission is a single body of controlled flexibility firmly attached to the handlebar and the fork, defining a joint rotation axis according to a junction point of the handlebar set with the upper steering tube and a junction point of the fork with the lower steering tube, and which works preloaded in extension so that the means for rotation transmission fixes the handlebar assembly and the fork with respect to the frame in a direction of the joint rotation axis, which together with a linear guide between the handlebar assembly and the fork, restricts all movements and rotations except the relative movement of the handlebar with respect to the fork on the joint rotation axis and the synchronized rotation of the handlebar and fork assembly with respect to the joint rotation axis.

5. The bicycle according to claim 1, in which the means for rotation transmission is a single body with controlled flexibility firmly attached to the handlebar and the fork, defining a joint rotation axis according to a junction point of the handlebar set with the upper steering tube and a junction point of the fork with the lower steering tube, and which works preloaded in extension so that the means for rotation transmission fixes the handlebar assembly and the fork with respect to the frame in a direction of the joint rotation axis, restricting all movements and rotations except the relative movement of the handlebar assembly relative of the fork on the joint rotation axis and the synchronized rotation of the handlebar and fork with respect to the joint rotation axis.

6. The bicycle according to claim 2, wherein the means for rotation transmission is located within a projected inner volume of the upper and lower steering tubes of the frame.

7. The bicycle according to claim 1, in which a trajectory of a virtual pivot of rotation that defines the relative displacement of the lower steering tube with respect to the upper steering tube is delimited in a space that confers anti-dive characteristics greater than 0%.

8. The bicycle according to claim 1, comprising a rear wheel attached to rear dropouts of the frame, a saddle assembly attached to a seat tube of the frame, and a set of pedals attached to a bottom bracket of the frame, and wherein a vertical flexibility of the frame between the rear dropouts and the seat tube is greater than a sum of a vertical flexibility of the rear wheel and the saddle assembly, and is at least an order of magnitude higher than a vertical flexibility of the frame between the bottom bracket and seat tube, and a vertical flexibility of the frame between the upper steering tube and the seat tube.

9. The bicycle according to claim 8, in which the path of a virtual pivot of rotation that defines the relative movement of the rear dropouts with respect to the seat tube and bottom bracket is delimited in a space that confers anti-squat and brake-squat characteristics close to 100%.

10. The bicycle according to claim 8, comprising:
a front absorber/damping means that controls a displacement of the lower steering tube with respect to a rigid assembly of the frame comprising the upper steering tube, the seat tube and the bottom bracket;
a rear absorption/damping means that controls a movement of the rear dropouts with respect to the rigid assembly of the frame; and
a crossed absorption/damping means that controls a displacement of the lower steering tube with respect to the rear dropouts.

11. The bicycle according to claim 8, comprising:
a crossed absorption/damping means that controls a displacement of the lower steering tube with respect to the rear dropouts; and
a front absorber/damping means that controls a displacement of the lower steering tube with respect to a rigid assembly of the frame comprising the upper steering tube, the seat tube and the bottom bracket; or
a rear absorption/damping means that controls a movement of the rear dropouts with respect to the rigid assembly of the frame.

12. The bicycle according to claim 10, in which a ratio between, a force ratio applied to the lower steering tube relative to a force applied on the crossed absorption/damping means, and a force ratio applied to the rear dropout relative to a force applied to the crossed absorption/damping means, is of similar magnitude to a ratio of forces applied on the lower steering tube and forces applied on the rear dropouts when pedaling.

13. The bicycle according to claim 7, in which the trajectory of the virtual pivot of rotation is delimited in a space that confers anti-dive characteristics between 50% and 100%.

14. A bicycle, comprising:
at least one frame defined in a principal plane; which comprises an upper steering tube defined with respect to an upper axis that is part of the main plane, and a lower steering tube defined with respect to a lower axis that forms part of the main plane and is significantly collinear with the upper axis;
a handlebar assembly attached to the upper steering tube of the frame in such a way that at least a relative rotation between the handlebar assembly and the upper steering tube is allowed with respect to the upper axis, but relative displacements between the handlebar assembly and the upper steering tube are limited at least in directions perpendicular to the upper axis;
a fork attached to the lower steering tube of the frame so that the fork has the same degrees of freedom relative to the lower axis between the fork and the lower steering tube as the degrees of freedom between the handlebar assembly and the upper steering tube with respect to the upper axis; and
a rotation transmission device configured to transmit at least partially a rotation of the handlebar assembly with respect to the upper tube to a rotation of the fork with respect to the lower tube,
wherein a vertical flexibility of the frame between the upper steering tube and the lower steering tube is greater than a sum of a vertical flexibility of the handlebar assembly between a point of attachment of the handlebar assembly to the upper steering tube and any other point of the handlebar assembly, and a vertical flexibility of the fork between a point of attachment of the fork to the lower steering tube and any other point of the fork.

* * * * *